UNITED STATES PATENT OFFICE.

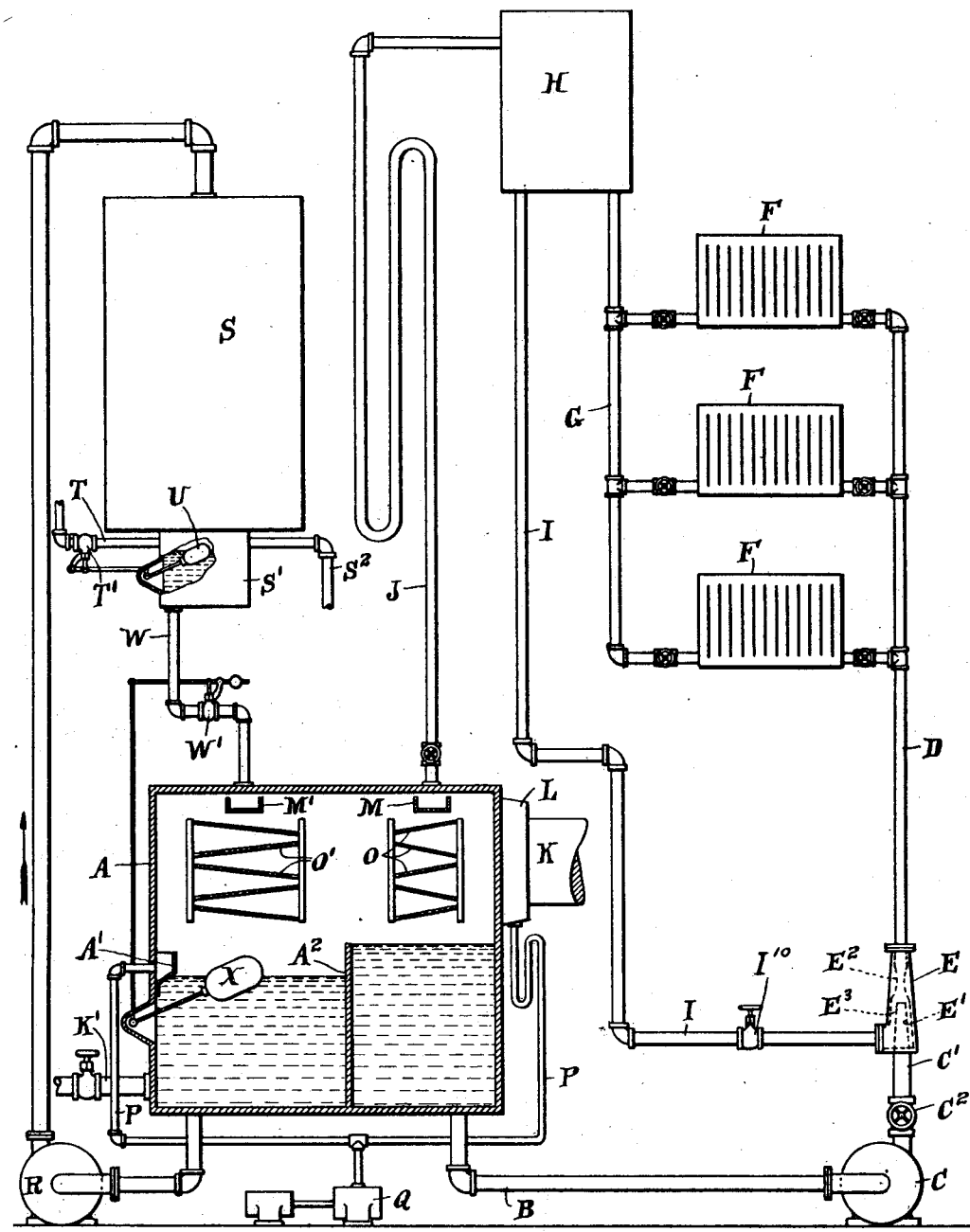

GEORGE H. GIBSON, OF MONTCLAIR, NEW JERSEY.

HOT-WATER HEATING SYSTEM.

1,142,785.

Specification of Letters Patent.

Patented June 8, 1915.

Application filed September 22, 1913. Serial No. 791,003.

*To all whom it may concern:*

Be it known that I, GEORGE H. GIBSON, a citizen of the United States of America, residing in Montclair, in the county of Essex and State of New Jersey, have invented a certain new and useful Improvement in Hot-Water Heating Systems, of which the following is a true and exact description, reference being had to the accompanying drawings, which form a part thereof.

My present invention relates to heating systems, in which the circulating medium is hot water.

The general object of the invention is the production of a simple, reliable and effective heating system, in which a heater like the well known open feed water heaters for heating boiler feed water or the like is employed for heating the water circulated through the heating system, and also serves as a condenser for condensing steam supplied to the heater in excess of the amount required to heat up the water for the heating system, and whereby also the temperature of the water supplied by the heater to the heating system may be varied when this is desirable.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described apparatus in which my invention may be embodied.

The one figure of the drawings is a diagrammatic elevation partly in section of a complete heating system.

In the drawings, A represents an open feed water heater from which hot water is drawn to supply the hot water heating system through the pipe B by the centrifugal pump C. The pump C discharges the water drawn from the heater through the check or non-return valve $C^2$ and pipe C' into the circulating system proper. This system, as somewhat conventionally illustrated in the drawing, comprises a riser pipe D, a pipe G leading to the expansion tank H, a plurality of radiators F connected in the usual manner between the pipes D and G, a return pipe I from the expansion tank H, and an inspirator E to which the pipes C', D and I are connected.

$I^{10}$ represents a throttle valve in the pipe I.

The pipe C' is connected to the expansion nozzle E', the pipe D to the compression nozzle $E^2$, and the pipe I to the inlet or suction chamber $E^3$ of the inspirator E. It will be observed that the inspirator E is connected to the circulating system proper at such a point that the water jet entering it through the pipe C' passes therefrom through the main heat radiating portion, formed as shown by the radiators F, of the circulating system.

With the arrangement described, the total volume of flow through the pipes D, G and I will necessarily be somewhat greater than, and, indeed, may be several times that of the volume of flow through the pipes B and C'. The rate at which hot water is supplied to the circulating system, and thereby the temperature in and the heating effect of the latter may obviously be regulated, as by varying the speed of the pump or otherwise varying its effective capacity.

Characteristic features and advantages of a hot water circulating system in which an inspirator is employed, are set forth in my copending application, Serial No. 2308, filed January 15, 1915, in which claims are made to certain features of the circulating system including the inspirator E employed in the apparatus disclosed herein.

It will be apparent of course that since water is consequently being fed into the circulating system proper from the heater by the pump C, a corresponding amount of water must be removed from the circulating system. This is accomplished in the apparatus shown in the drawing by means of the overflow pipe J leading from the expansion tank H back to the heater A, wherein it discharges into the trough M, overflowing from the latter onto the usual splash trays O. The energy represented by the head of the water overflowing from the expansion tank into the heater through the pipe J is lost. Inasmuch, however, as the volume of flow through the pipes C' and J may be made small in comparison with the total volume of flow through the circulating system proper, except, at least, on comparatively rare occasions when the demands on the heating system are much above the average, the average loss of energy from this cause may be comparatively small.

The heater A is supplied with steam through the pipe K and oil separator L, and is provided with an overflow connection A' limiting the height of water level in the heater, and with float actuated means for supplying make up water to maintain a minimum height of water level in the heater. In the respects just noted the heater A does not differ in principle from the ordinary open feed water heater long known and in common use. The heater has certain special provisions and adjuncts, however, to adapt it for use in carrying out the second object stated above; i. e., to enable it to serve as a condenser for condensing steam which may be supplied to it by the pipe K in amount substantially in excess of that required to heat the water supplied to the hot water heating system or otherwise withdrawn from the heater and utilized. For this purpose a pump R is provided for drawing water from the heater and forcing it into a cooling tower S, from the cold well S' of which the water is returned through the pipe W to the heater. The water thus returned to the heater is discharged into a trough M' overflowing onto splash trays O'. The rate at which the water is returned to the heater is automatically controlled by a valve W' in the pipe W and a float X responsive to the water level in the heater, or in one compartment thereof as hereinafter explained. The valve W' is automatically opened and closed by the float X as the water level in the heater or heater compartment falls below and rises to a predetermined height which is below the level of overflow into the connection A'. The cold well S' of the cooling tower S is provided with an overflow pipe S², and excess water accumulating in the system may be discharged by this pipe as well as through the heater overflow A'. A supply pipe T containing a valve T' supplies makeup water when necessary to maintain the proper amount of water in the cold well. The valve T' is automatically actuated by a float U which opens and closes the valve T' as the water level in the cold well S' of the cooling tower falls below and rises to a predetermined height. In general, it will be understood that the system, in so far as already described, tends to constantly gain water by condensation of the steam passing into the heater through the pipe K. It is necessary, however, to make up for some leakage from the hot water heating system proper and for an evaporation and spray loss in the cooling tower when used, which will ordinarily be greater than the leakage loss in the heating system proper. Moreover, the heater may supply hot water, as through the pipe K', for other purposes. The make up supply pipe T is thus generally necessary. I prefer to divide the water space in the heater A into two compartments as by the partition A² which projects above the water level which it is desired to maintain in the water space to the left of the partition in which the float X is located. The water from the trays O and O' passes to the compartments at the right and left, respectively, of the partition A². Inasmuch as the leakage in the heating system proper under normal conditions will be less than the water of condensation passing into the compartment at the right of the partition A², the water level at the right of the partition A² will normally be maintained at the top of the partition A², and water will constantly flow over the partition to the water space at the left hand side thereof. This insures a constant head of water at the inlet of the pump C. Advantageously, the steam admission to the heater is located adjacent the splash trays O, as this permits the water passing through the pump C to be properly heated even though the available supply of steam may be insufficient to correspondingly heat water which may be passed over the trays O'. A vacuum pump Q connected to the heater, makes it possible to maintain a vacuum, or pressure less than the atmosphere, in the heater. As shown, the vacuum pump Q is connected by the piping P to the overflow connection A' and separator L and serves to draw off water which may overflow into the overflow compartment A' and oil which may collect in the separator L, as well as the air or other non-condensable gas or vapor collecting in the heater.

With the apparatus described it will be apparent that the temperature maintained in the heater A and its condensing capacity may be varied by varying the rate at which the pump R draws water from the heater and passes it through the cooling tower S, for the condensing capacity of the heater varies directly and the temperature maintained therein tends to vary inversely with the amount of cold water returned to the heater from the cooling tower.

Other forms of apparatus embodying the combination of an open water heater, a hot water circulating system and a cooling tower, as well as the apparatus shown herein, are disclosed in my copending application Serial No. 791,002 filed of even date herewith, wherein I have made generic claim on this combination.

While in accordance with the provisions of the statutes I have illustrated and described the best form of my invention now known to me, it will be apparent to those skilled in the art that changes may be made in the form of the apparatus disclosed, without departing from the spirit of my invention, and that under some conditions certain features of my invention may be used without a corresponding use of other features.

Having now described my invention, what I claim as new and desire to secure by Letters Patent, is:

1. In combination, an open water heater comprising a heating chamber, a steam supply connection to said chamber, a hot water circulating, heat radiating system connected to and receiving hot water from and returning cold water to said chamber, a cooling tower, and means independent of said circulating system for passing water from said chamber into said cooling tower and returning it to said chamber whereby the temperature of the water delivered by the heater to the heating system and the steam condensing capacity of the heater may be varied by varying the rate at which water is passed to the cooling tower and returned to said chamber.

2. In combination, an open water heater comprising a heating chamber, a steam supply connection to said chamber, a hot water circulating, heat radiating system including a circulating pump connected to and receiving hot water from and returning cold water to said chamber, a vacuum pump connected to said chamber, a cooling tower, and an independent pump for passing water from said chamber into said cooling tower and returning it to said chamber whereby the temperature of the water delivered by the heater to the heating system and the steam condensing capacity of the heater may be varied by varying the rate at which water is passed to the cooling tower and returned to said chamber.

3. In combination, an open water heater comprising a heating chamber, a steam supply connection to said chamber, a hot water circulating, heat radiating system connected to and receiving hot water from, and returning cold water to said chamber, a cooling tower located above said heating chamber, means for passing water from said chamber into said cooling tower, a return connection from said tower to said chamber and means responsive to the height of water level in said chamber for controlling the flow through said return connection.

4. In combination, an open water heater comprising a heating chamber, a steam supply connection to said chamber, a hot water circulating, heat radiating system connected to and receiving hot water from, and returning cold water to said chamber, a cooling tower located above said heating chamber, means for passing water from said chamber into said cooling tower, a return connection from said tower to said chamber, means including an overflow connection and a float controlled make up water supply connection for maintaining a substantially constant accumulation of water in said tower, and means responsive to the height of water level in said chamber for controlling the flow through said return connection.

5. In combination, an open water heater comprising a heating chamber, a partition dividing the lower portion of said chamber into two water compartments each open to the common steam space in the upper portion of said chamber, a set of splash trays above each compartment, a hot water circulating, heat radiating system receiving hot water from one of said compartments and returning cold water to the splash trays above the same, means for maintaining a water level in the other compartment below the level at which water will flow into the latter over said partition and for controlling the water heating and steam condensing capacity of said heater including a cooling tower and means for withdrawing water from the last mentioned compartment and returning it to the splash trays above the same after passing through said cooling tower, and a steam supply connection to said chamber.

6. In combination, an open water heater comprising a heating chamber, a partition dividing the lower portion of said chamber into two water compartments each open to the common steam space in the upper portion of said chamber, a set of splash trays above each compartment, a hot water circulating, heat radiating system receiving hot water from one of said compartments and returning cold water to the splash trays above the same, means for maintaining a water level in the other compartment below the level at which water will flow into the latter over said partition and for controlling the water heating and steam condensing capacity of said heater including a cooling tower and means for withdrawing water from the last mentioned compartment and returning it to the splash trays above the same after passing through said cooling tower, and a steam supply connection to said chamber opening to said chamber at the side remote from the last mentioned splash trays and adjacent the splash trays receiving the water returned from said circulating system.

GEORGE H. GIBSON.

Witnesses:
 NORMAN K. CONDERMAN,
 ROBERT G. CLIFTON.